United States Patent [19]

Hagino

[11] Patent Number: 5,150,220
[45] Date of Patent: Sep. 22, 1992

[54] VIDEO SIGNAL-PROCESSING CIRCUIT FOR OUTPUTTING A DROP OUT SIGNAL SUPERIMPOSED ON A CORRELATION/NONCORRELATION SIGNAL

[75] Inventor: Hideyuki Hagino, Fukaya, Japan

[73] Assignee: Kabushiki Kaisha Toshiba, Kawasaki, Japan

[21] Appl. No.: 582,079

[22] Filed: Sep. 14, 1990

[30] Foreign Application Priority Data

Sep. 19, 1989 [JP] Japan .................. 1-240759

[51] Int. Cl.$^5$ .................. H04N 5/94; H04N 9/88
[52] U.S. Cl. .................. 358/336; 358/314; 360/38.1
[58] Field of Search .......... 358/336, 314, 328, 329, 358/310, 340, 36, 37, 166, 167; 360/33.1, 38.1

[56] References Cited

U.S. PATENT DOCUMENTS

| | | | |
|---|---|---|---|
| 4,291,330 | 9/1981 | Hirai | 358/328 |
| 4,398,219 | 8/1983 | Yasuda | 358/314 |
| 4,509,078 | 4/1985 | Kuroda | 358/314 |
| 4,510,530 | 4/1985 | Miura et al. | 358/314 |
| 4,591,925 | 5/1986 | Trytko | 360/38.1 |
| 4,677,487 | 6/1987 | Tomita et al. | 358/340 |
| 4,682,251 | 7/1987 | Hirota et al. | 358/335 |
| 4,689,695 | 8/1987 | Urata | 358/310 |
| 4,723,175 | 2/1988 | Ichinoi et al. | 358/316 |
| 4,796,096 | 1/1989 | Sakura et al. | 358/310 |

FOREIGN PATENT DOCUMENTS

| | | | |
|---|---|---|---|
| 52-35935 | 3/1977 | Japan | 358/328 |
| 59-37788 | 3/1984 | Japan | 358/336 |

Primary Examiner—Donald McElheny, Jr.
Assistant Examiner—Thai Tran
Attorney, Agent, or Firm—Finnegan, Henderson, Farabow, Garrett and Dunner

[57] ABSTRACT

A video reproduction signal-processing circuit is an integrated circuit and is incorporated in a video tape recorder. In this integrated circuit, a dropout-detecting circuit generates a dropout signal, and a limiter circuit and a wave-shaping circuit jointly output a noncorrelation/correlation signal. The dropout signal and the noncorrelation/correlation signal are first added together by an adder circuit, and are then output from the integrated circuit through a single output terminal.

3 Claims, 3 Drawing Sheets

VIDEO SIGNAL-PROCESSING CIRCUIT FOR OUTPUTTING A DROP OUT SIGNAL SUPERIMPOSED ON A CORRELATION/NONCORRELATION SIGNAL

BACKGROUND OF THE INVENTION

1. Field of the Invention

The present invention relates to an integrated circuit which is incorporated in a video tape recorder for the processing of video signals More particularly, it relates to a video signal-processing semiconductor integrated circuit used for the processing, such as dropout compensation, comb filtering of luminance signals, chroma noise reduction, or the like.

2. Description of the Related Art

In general, a video tape recorder (hereinafter referred to as a VTR) is provided with a dropout compensator (DOC). This dropout compensator prevents a non-signal portion from being included in the frequency-modulated (FM) signal reproduced from the magnetic tape, so as to reproduce a noise-free image on a screen. The VTR is also provided with a noncorrelation/correlation processing circuit, so as to carry out the chroma noise reduction processing. The noncorrelation/correlation processing circuit generates a noncorrelation/correlation signal by use of a luminance signal obtained by demodulating the reproduced FM signal.

In a conventional VTR, the dropout compensator and the noncorrelation/correlation processing circuit are formed in the same integrated circuit but are completely independent of each other. In addition, DOC pulses produced from the dropout compensator and noncorrelation/correlation pulses are output from the integrated circuit through their respective output terminals.

Since the dropout compensator and the noncorrelation/correlation processing circuit are formed independently of each other in the conventional VTR, output terminals have to be provided for them independently of each other.

An integrated circuit recently developed for VTRs is provided with many functions, and therefore has an increased number of output terminals. However, an increase in the number of output terminals necessitates an increase in the chip size, thus resulting in an increase in the cost for manufacturing the VTR. It is therefore desirable that the number of output terminals be as small as possible.

SUMMARY OF THE INVENTION

The present invention has been developed in consideration of the above circumstances, and an object of the present invention is to provide video signal-processing semiconductor integrated circuit which incorporates both a dropout compensator and a noncorrelation/correlation processing circuit and which enables reduction of the number of output terminals.

To achieve this object, the present invention provides a video signal-processing semiconductor integrated circuit, which comprises: dropout signal-generating means, supplied with a frequency-modulated (FM) video reproduction signal, for generating a dropout signal when the video reproduction signal has an amplitude level lower than a predetermined value; delay means for delaying a luminance signal, obtained by demodulating the video reproduction signal, by one horizontal period; subtraction means for obtaining a difference component between the luminance signal delayed by the delay means and the luminance signal not delayed by the delay means; noncorrelation/correlation signal-generating means for deriving a noncorrelation/correlation signal from the difference component obtained by the subtraction means; adder means for adding the dropout signal and the noncorrelation/correlation signal together and generating a signal obtained by the addition; and one output terminal for outputting the signal generated by the adder means to an external region.

DETAILED DESCRIPTION OF THE PREFERRED EMBODIMENT

Figure 1:
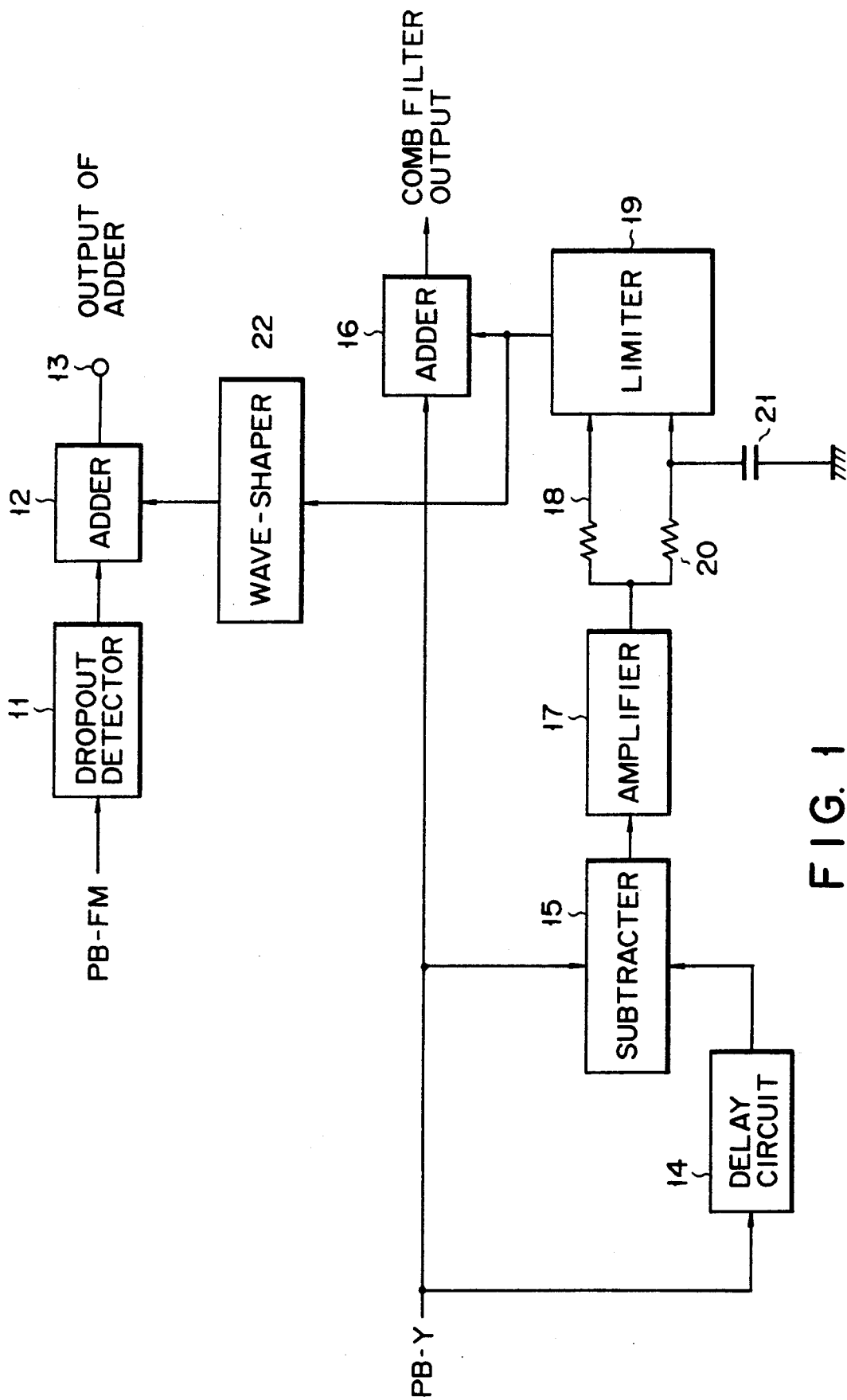
FIG. 1 is a block circuit diagram showing a video signal-processing semiconductor integrated circuit according to one embodiment of the present invention.

FIG. 1 shows the internal circuit arrangement of a video signal-processing semiconductor integrated circuit according to one embodiment of the present invention. Referring to FIG. 1, a reproduction FM signal (PB-FM), which is obtained from a video tape by a magnetic head (not shown), is supplied to a dropout-detecting circuit 11. This dropout-detecting circuit 11 detects the amplitude level of the reproduction FM signal and produces a dropout compensation pulse (i.e., a DOC pulse) if the detected amplitude level temporarily becomes very low or if it becomes zero. The dropout compensation pulse is supplied to an adder circuit 12. An output of this adder circuit 12 is supplied to a external circuit through an output terminal 13.

In the meantime, a reproduction luminance signal (PB-Y), which is produced by a demodulating circuit (not shown) as a result of the demodulation of the above-mentioned reproduction FM signal, is supplied, in parallel, to a delay circuit 14, a subtraction circuit 15, and an adder circuit 16. In the delay circuit 14, the reproduction luminance signal is delayed by a time interval corresponding to one horizontal period, and the delayed signal is supplied to the subtraction circuit 15. In the subtraction circuit 15, the signal delayed by the delay circuit 14 is subtracted from the reproduction luminance signal which is not delayed, and a signal obtained by this subtraction is supplied to an amplifier circuit 17. In this amplifier circuit 17, the signal is amplified to have a predetermined level. The level-amplified signal is supplied to the first one of a pair of input terminals of a limiter circuit 19 by way of a first resistor element 18. It is also supplied to the second one of the input terminals of the limiter circuit 19 by way of a second resistor element 20. The limiter circuit 19 is of a differential amplification type. A capacitor 21, used for both the bypassing of a.c. signals and the accumulation of d.c. signals, is inserted between the second input terminal of the limiter circuit 19 and a ground potential point. Due to the second resistor element 20 and the capacitor, only the d.c. components of the level-amplified signal are input to the second input terminal of the limiter circuit 19.

In the limiter circuit 19, the level-amplified signal supplied from the amplifier circuit 17 is compared with its d.c. components input to the second input terminal, and is limited on the basis of a predetermined slice level. The signal, thus limited, is supplied to the adder circuit 16. It is also supplied to the adder circuit 12 by way of a waveform-shaping circuit 22.

Figure 2:
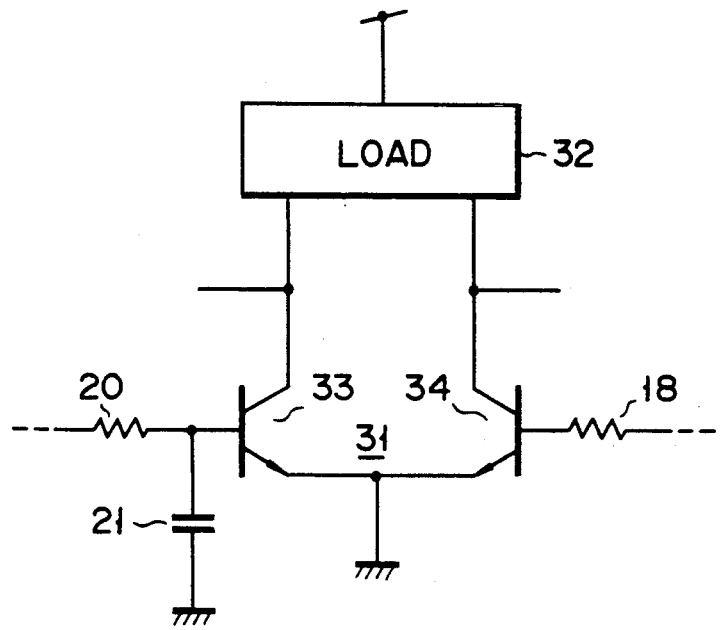
FIG. 2 is a circuit diagram showing a specific circuit arrangement of part of the circuit shown in FIG. 1.

An output of the adder circuit 12 is supplied to an external point of the integrated circuit through the output terminal 13. An output of the adder circuit 16 is supplied to a circuit (not shown) formed within the integrated circuit FIG. 2 is a circuit diagram showing the specific circuit arrangement of the limiter circuit 19 included in the integrated circuit shown in FIG. 1. As is shown in FIG. 2, the limiter circuit 19 includes a differential transistor pair 31 made up of transistors 33 and 34. These transistors 33 and 34 are connected together at their emitters, and their bases respectively receive the signals which the amplifier circuit 17 supplies through the first and second resistor elements 18 and 20. The limiter circuit 19 also includes a load circuit 32 connected to the differential transistor pair 31. The capacitor 21 mentioned above is connected between the base of one transistor 33 of the differential transistor pair 31 and the ground potential point. A d.c. bias potential used for determining the slice level is applied to the base of transistor 33. A signal obtained by superimposing a.c. signal components on the d.c. bias potential is supplied to the base of the other transistor 34 of the differential transistor pair 31.

In the above circuit arrangement, the output of the limiter circuit 19 is in a correlation state if its level is lower than the slice level of the limiter circuit 19, and is in a noncorrelation state if its level is higher than the slice level. In short, the output of the limiter circuit 19 is a noncorrelation/correlation signal. The adder circuit 16 adds this noncorrelation/correlation signal to its original signal (i.e., the reproduction luminance signal), so that an output of the adder circuit 16 is a comb filter output, i e., a signal obtained by causing a luminance signal to pass through a comb filter.

The adder circuit 12 adds the noncorrelation/correlation signal to the DOC pulse (which is output from the dropout-detecting circuit 11). The resultant signal is output from the output terminal 13 and is supplied to an external point of the integrated circuit.

As is understood from the above, signals of two kinds (which, in the prior art, are output from their respective output terminals independently of each other) are output from one terminal 13 in the circuit of the embodiment. Thus, the number of output terminals used in the embodiment circuit is smaller than that of the prior art. Incidentally, since the signals of two kinds are output from one output terminal, they have to identified on the side of an external circuit which performs processing in response to them. This signal identification can be easily performed by causing the adder circuit 12 to generate voltage levels having three difference values, as will be described below.

Figure 4:
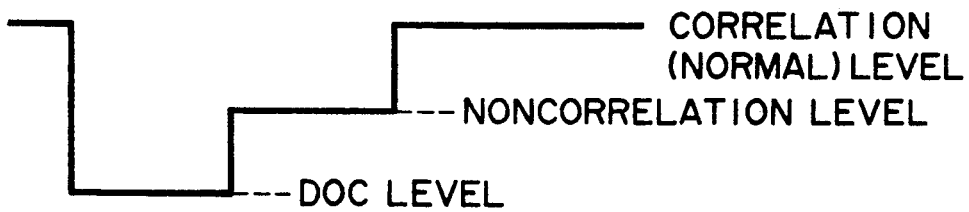
FIG. 4 is a waveform chart illustrating the waveform of one of the signals shown in FIG. 3.
Figure 3:
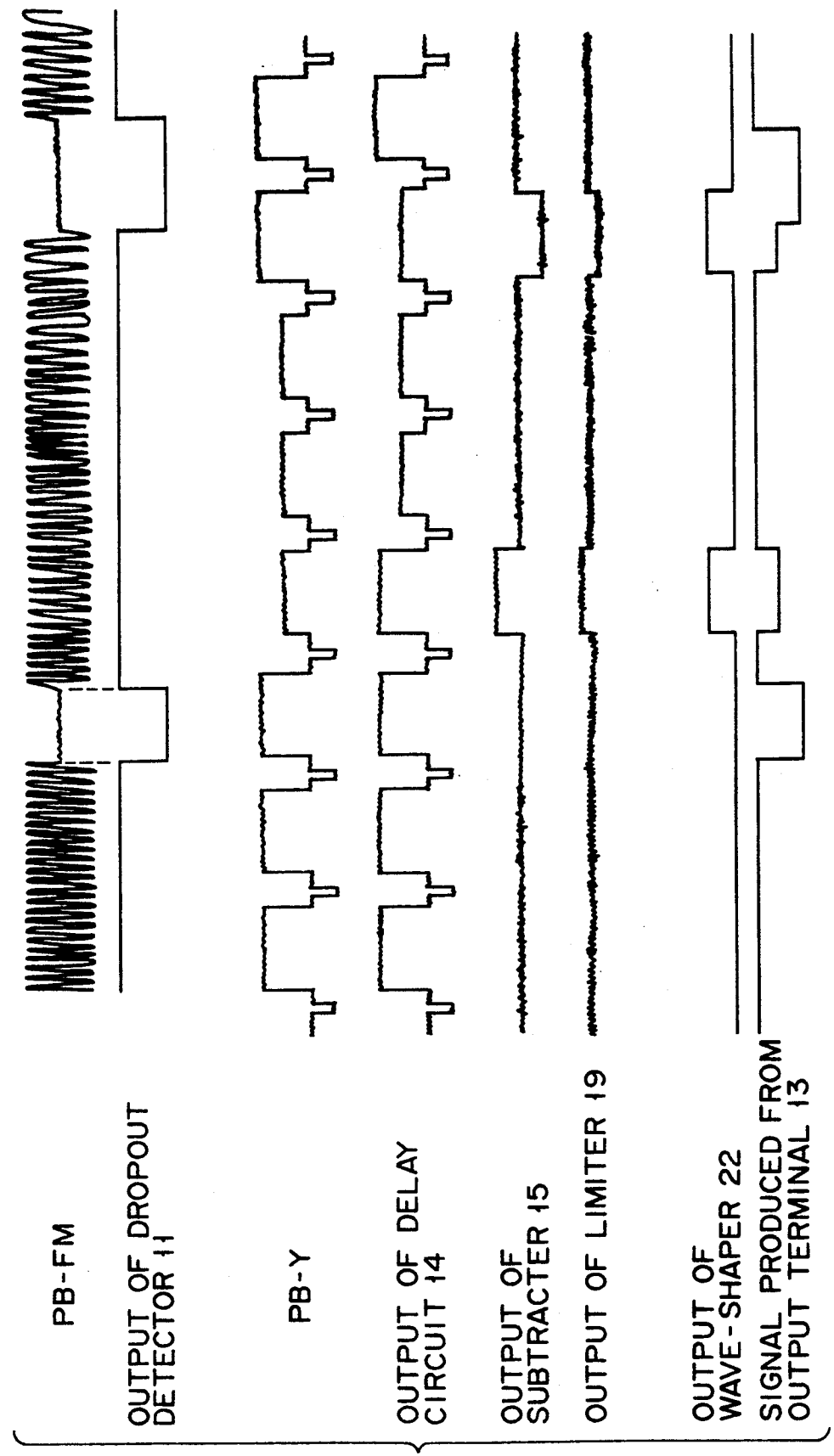
FIG. 3 is a waveform chart illustrating the waveforms of the signals produced at major points of the circuit shown in FIG. 1.

FIG. 4 is an enlarged waveform chart illustrating the waveform of the signal output from the output terminal 13. When the dropout-detecting circuit 11 generates a DOC pulse, the signal output from the output terminal 13 has the lowest level (i.e., a DOC level). When the noncorrelation/correlation signal is in a correlation state, the signal output from the output terminal 13 has a noncorrelation level higher than the lowest level. When the noncorrelation/correlation signal is in a noncorrelation state, the signal output from the output terminal 13 has the highest level (i.e., a normal level). Therefore, the above-mentioned signals of two kinds can be identified and detected by simply providing two level-detecting circuits for an external circuit (not shown) connected to the output terminal 13, namely: a first level-detecting circuit whose slice level is between the DOC level and the noncorrelation level and which detects whether the input level is higher or lower than the slice level; and a second level-detecting circuit whose slice level is between the noncorrelation level and the normal level and which detects whether the input level is higher or lower than the slice level. With the signals of two kinds being detected in this manner, the circuit supplied with the signal output from the output terminal 13 carries out dropout compensation by use of the DOC pulse, or carries out chroma noise reduction by use of the noncorrelation/correlation signal.

As described in the foregoing, the present invention can provide a video signal-processing semiconductor integrated circuit which incorporates both a dropout compensator and a noncorrelation/correlation processing circuit and which enables reduction of the number of output terminals.

What is claimed is:

1. A video signal-processing semiconductor integrated circuit, comprising:

dropout signal-generating means, supplied with a frequency-modulated video reproduction signal, for generating a dropout signal when the video reproduction signal has an amplitude level lower than a predetermined value;

delay means for delaying a luminance signal, obtained by demodulating the video reproduction signal, by one horizontal period;

subtraction means for obtaining a difference component between the luminance signal delayed by the delay means and the luminance signal not delayed by the delay means;

noncorrelation/correlation signal-generating means for outputting a signal having a first level if the difference component obtained by the subtraction means is larger than a predetermined level and for outputting a signal having a second level different from said first level if the difference component is smaller than said predetermined level;

adder means for adding the dropout signal and the noncorrelation/correlation signal generated by the noncorrelation/correlation signal generating means together and generating a signal obtained by the addition; and one output terminal for outputting the signal generated by the adder means to an external region.

2. A video signal-processing semiconductor integrated circuit according to claim 1, wherein said noncorrelation/correlation signal-generating means includes:

a limiter for slicing a signal representing the difference component obtained by the subtraction means; and wave-shaping means for shaping the waveform of an output of the limiter.

3. A video signal-processing semiconductor integrated circuit according to claim 1, further comprising:

second adder means for adding the luminance signal to the noncorrelation/correlation signal, so as to produce a comb filter output.

* * * * *